(12) United States Patent
Anderson (10) Patent No.: US 9,853,347 B2
(45) Date of Patent: Dec. 26, 2017

(54) HANDRAIL MOUNTABLE WIRELESS COMPONENTS INSTALLATION APPARATUS

(71) Applicant: William C. Anderson, Garland, TX (US)

(72) Inventor: William C. Anderson, Garland, TX (US)

(73) Assignee: AmpThink, LLC, Garland, TX (US)

( * ) Notice: Subject to any disclaimer, the term of this patent is extended or adjusted under 35 U.S.C. 154(b) by 55 days.

(21) Appl. No.: 14/581,955

(22) Filed: Dec. 23, 2014

(65) Prior Publication Data

US 2015/0181645 A1 Jun. 25, 2015

Related U.S. Application Data

(60) Provisional application No. 61/920,474, filed on Dec. 24, 2013.

(51) Int. Cl.
| | | |
|---|---|---|
| *H04B 1/03* | (2006.01) | |
| *H01Q 1/22* | (2006.01) | |
| *F16M 13/02* | (2006.01) | |
| *F16M 11/10* | (2006.01) | |
| *F16M 11/20* | (2006.01) | |
| *E04F 11/18* | (2006.01) | |

(52) U.S. Cl.
CPC ............. *H01Q 1/22* (2013.01); *E04F 11/18* (2013.01); *F16M 11/10* (2013.01); *F16M 11/2014* (2013.01); *F16M 13/02* (2013.01)

(58) Field of Classification Search
CPC ..... F16M 11/10; F16M 13/02; F16M 11/2014; E04F 11/18; E04F 11/1808; H01Q 1/22
See application file for complete search history.

(56) References Cited

U.S. PATENT DOCUMENTS

| | | | | |
|---|---|---|---|---|
| 6,133,531 | A * | 10/2000 | Hayduke ........... | H02G 3/081 174/67 |
| 2004/0018917 | A1 * | 1/2004 | Corbalis ........... | A63B 22/02 482/54 |
| 2012/0264568 | A1 * | 10/2012 | Allowitz-Thompson | G06F 19/3481 482/4 |

* cited by examiner

*Primary Examiner* — James Wu
(74) *Attorney, Agent, or Firm* — Ferguson Braswell Fraser Kubasta PC; Kelly J. Kubasta (57) ABSTRACT

A handrail mountable wireless components installation apparatus and related method of installation are disclosed. The apparatus/method includes a shell having two parts, a wireless components housing and a lid; and a chassis for the fixedly but detachable mounting within the shell of the wireless electronic components necessary to provide a WiFi signal, as for example a router and an antenna, the chassis equipped with two sets of brackets. One set of brackets provides the anchoring means for the fastening of the lid onto the housing. The second set of brackets allows the enclosure to be mounted on the handrail. Optionally, the chassis is provided with a mounting plate for the mounting of a router and an opening capable of accommodating an antenna without impeding the flow of the antenna signal. Optionally, the weather resistant handrail mountable wireless components installation apparatus also comprises a gasket.

22 Claims, 14 Drawing Sheets

SECTION B-B
SCALE 1:8

HANDRAIL MOUNTABLE WIRELESS COMPONENTS INSTALLATION APPARATUS

CROSS REFERENCE TO RELATED APPLICATIONS

This application claims priority to provisional patent application 60/920,474, filed Dec. 24, 2013, the entirety of which is hereby incorporated by reference for all purposes.

TECHNICAL FIELD

This invention relates to an apparatus for the mounting and installation of wireless components on handrails. More particularly, the disclosed principles relates to a wireless components enclosure or housing capable of being mounted on handrails in sports stadiums. Specifically it relates to a weather resistant shell, mountable on a handrail, as for example handrails in stadiums, which weather resistant shell supports, houses, and protects wireless components necessary to provide a WiFi signal to all of the fans and their wireless devices in the stadium.

BACKGROUND

The demand for wireless network capacity to provide connectivity for mobile devices including smartphones, tablet computers, and other mobile devices is growing exponentially across the planet. An important aspect of meeting that demand is expanding the footprint of wireless coverage, and in areas where large numbers of people congregate, providing very dense deployments. Here, density refers to installing more access points in a specific, confined physical space than is required to provide a signal to potential clients in that space. The demand for density is driven by the fact that a single access point (the device which bridges communications from a wireless device onto a wired network—for example the Internet) has finite capacity. By increasing density (increasing the number of access points in a space), network capacity is increased, enabling more devices to operate concurrently in a given space.

Increasing density brings specific challenges. Unlike communications over a wired network, communications over a wireless network are not constrained to a finite path. Data traveling over a wireless network is spread over the air and may collide with traffic from another device or access point. As density increases, the opportunity for collisions increases. As the number of access points increases, the need for physical space to mount the access points and any accessories (antennas, protective enclosures, mounting structures) increases. Distributing load across access points (balancing the number of devices connected to all access points) is best achieved when access points are distributed evenly throughout a deployment rather than consolidated in a single mounting location. Localizing the access point's coverage area (the space around an access point in which communications between an access point and a client device is viable) achieves better distribution, but also requires locating mounting structures that move access points closer to the connected wireless devices. In many installations, finding mounting locations closer to these devices is challenging.

In public venues, such as football stadiums where attendance can exceed 100,000 people, current industry best practices can call for the installation of 1,000 or more access points. These structures often lack sufficient walls, ceilings, or overhangs close enough to fans and the devices they want to wirelessly connect to the network to address the challenges outlined above. Getting the access point closer to the fan, while addressing venue operator concerns including security, public safety, and the visual impact of the equipment, has become one of the most significant challenges in developing an implementation that will develop enough distributed capacity to meet the demands of the potential end users.

Implementation experience and regulatory concerns have shown that some obvious opportunities to bring the equipment closer to the end user are not viable. For example, mounting equipment under the concrete below seating creates specific technical problems that drive poor network performance as network utilization is increased. Alternatively, mounting equipment directly under seats (above the concrete) makes protecting the equipment challenging, is potentially in violation of specific FCC exposure regulations, and does not allow the equipment to effectively radiate. Also, mounting directly behind seats quickly creates an unfavorable path for the wireless communications through human bodies that quickly de tune the signal and in many cases blocks site lines (and perhaps even leg room) for fans seated behind the installation.

On the other hand, these large public venues have hand rails installed on the stairways between seating sections. Installing and mounting equipment on handrails would be esthetically pleasing, provide better opportunities for the signal to effectively propagate through the crowd, meet the need to provide separation between the radiating antenna and the fan, and provide a logical structure for installing and cabling to the access point. Handrails have been used as mounting locations in a handful of stadiums to develop effective high density wireless networks. However, these installations have been very crude. Thus, in most cases the hand rail mounting strategy has been relegated to a strategy of last resort, particularly because each of these installations has failed to address key building codes and other functional requirements. Because the antenna transmits and receives radio signals, they are susceptible to RF obstructions and common sources of interference that can reduce throughput and range of the device to which they are connected. Mounting the antenna to utilize its propagation characteristics is an important aspect to increasing range and throughput. One way to do this is to orient the antenna vertically and mount it as high as possible but without interfering with holding the handrails. However, even such mounting technique has its drawbacks, as discussed below. Accordingly, the principles disclosed herein provide a handrail mountable wireless components installation apparatus, which is simple to install and easy to attach, and which overcomes the deficiencies of conventional approaches.

SUMMARY

It is an object of the disclosed principles to provide a handrail mountable wireless components installation apparatus, which is inexpensive to install and attach.

It is still another object of the disclosed principles to provide a handrail mountable wireless components installation apparatus, which automatically places the wireless components in the correct position and orientation on the hand rail, ensures that the installation can be reliably performed by a person with minimal familiarity with the apparatus and/or the manner of its installation, and increases the network quality by reducing the opportunity for installation errors.

It is yet another object of the disclosed principles to provide a handrail mountable wireless components installation apparatus, which is resistant to physical abuse ranging from unintentional bumps to deliberate strikes by individuals.

It is a further object of the disclosed principles to provide a handrail mountable wireless components installation apparatus which is modular and able to accommodate replacement equipment as part of a technology upgrade.

It is still a further object of the disclosed principles to provide a handrail mountable wireless components installation apparatus which can be mounted on any type of handrail, irrespective of the handrails' geometry.

It is yet another object of the disclosed principles to provide a handrail mountable wireless components installation apparatus, which properly protects the wireless, electronic components.

It is a further object of the disclosed principles to provide a handrail mountable wireless components installation apparatus, which is visually pleasing and has minimal negative aesthetic impact.

It is still a further object of the disclosed principles to provide a handrail mountable wireless components installation apparatus which does not obstruct walk ways, prevents snags, and, in accordance with building code requirements, does not prevent a person from grasping the hand rail.

It is still another object of the disclosed principles to provide a handrail mountable wireless components installation apparatus which leverages the handrail as a conduit for protecting the low voltage (Cat 5/6) cabling connecting the access point to a network. The network may be wired such as Ethernet or Wireless such as 3G, 4G, and/or LTE.

It is yet another object of the disclosed principles to provide a handrail mountable wireless components installation apparatus which is designed to reliably hold the enclosure in place, by using the handrail as part of the structure of the enclosure.

In accordance with the disclosed principles, there is provided a weather resistant handrail mountable wireless components installation apparatus comprising a shell having two parts, a wireless components housing and a lid; and a chassis for the fixedly but detachable mounting within the shell of the wireless electronic components necessary to provide a WiFi signal, as for example a router and an antenna, said chassis equipped with two sets of brackets. One set of brackets provides the anchoring means for the fastening of the lid onto the housing. The second set of brackets allows the enclosure to be mounted on the handrail. Optionally, the chassis is provided with a mounting plate for the mounting of a router and an opening capable of accommodating an antenna without impeding the flow of the antenna signal. Optionally, the weather resistant handrail mountable wireless components installation apparatus also comprises a gasket.

These and other objects, advantages, features, and characteristics of the invention will be apparent from the following description of a preferred embodiment, considered along with the accompanying drawings.

BRIEF DESCRIPTION OF THE DRAWINGS

It is believed that the presently disclosed principles will be better understood from the following detailed description taken in conjunction with the accompanying drawings, in which the numerals represent identical elements and wherein.

LIST OF ELEMENTS AND THEIR IDENTIFYING NUMERALS

10 Handrail Mountable Wireless Components Installation Apparatus
20 Shell
20A Shell upper edge
20B Shell lower edge
20C Shell proximate end
20D Shell Distal end
21 Wireless Components Housing
21A Wireless Components Housing Proximate End
21B Wireless Components Housing Distal End
21C Housing collinear arcuate section
22 Lid
22A Lid Proximate End
22B Lid Distal End
22C Lid collinear arcuate section
25 Shell Proximate End Through Bore
26 Short Bore
30 Chassis
30A Chassis top edge
30B Chassis Bottom Edge
30C Chassis proximate edge
30D Chassis Distal edge
32 Hand Rail Brackets
33 Hand Rail Bracket fastening hole
34 Lid Fastening Brackets
40 Gasket

DETAILED DESCRIPTION

Figure 1:
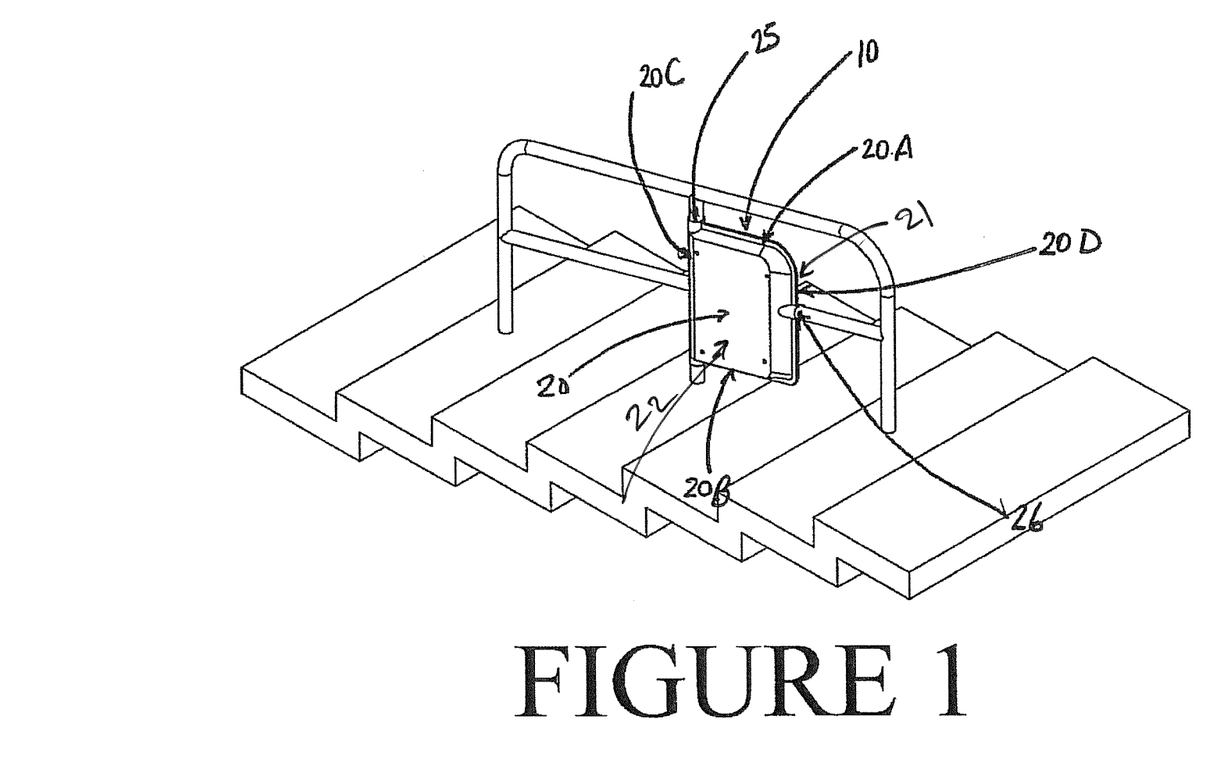
FIG. 1 is a three dimensional perspective of the handrail mountable wireless components installation apparatus as it is actually installed on a handrail.
Figure 2:
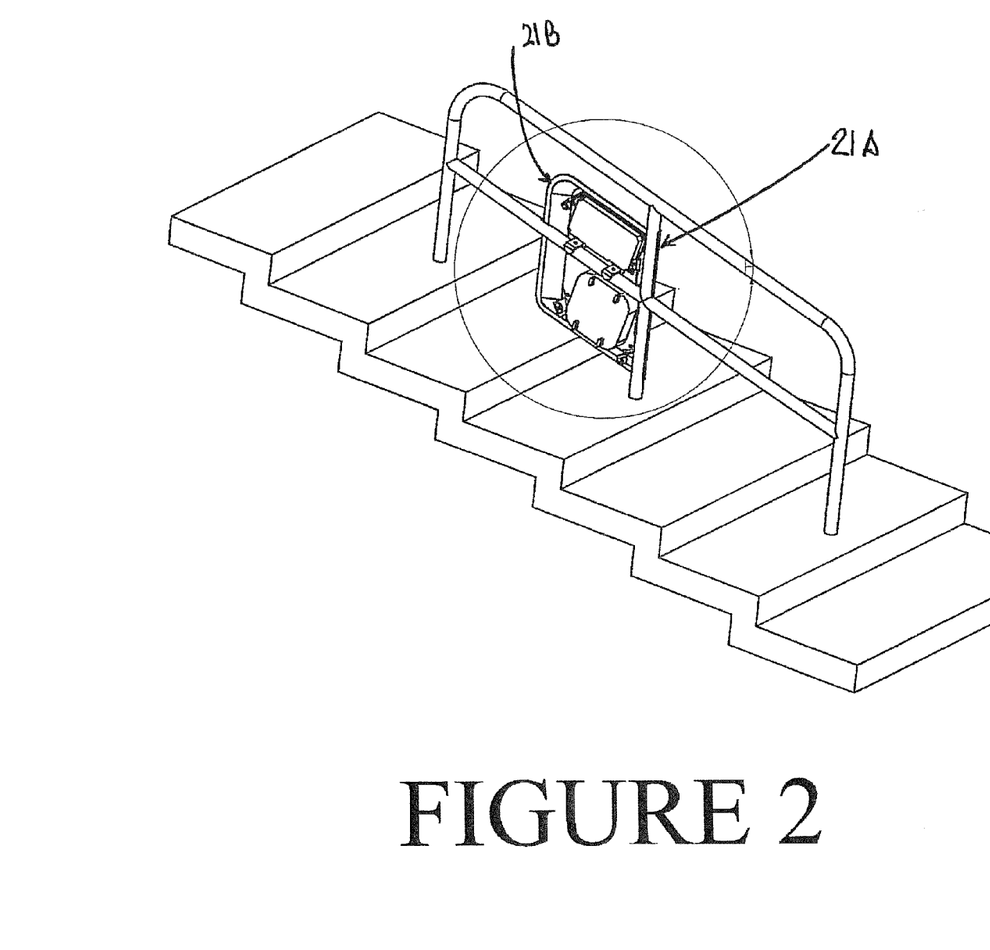
FIG. 2 is a three dimensional perspective of the handrail mountable wireless components installation apparatus as it is actually installed on a handrail with the lid removed and showing the wireless components mounted within the housing.
Figure 3:
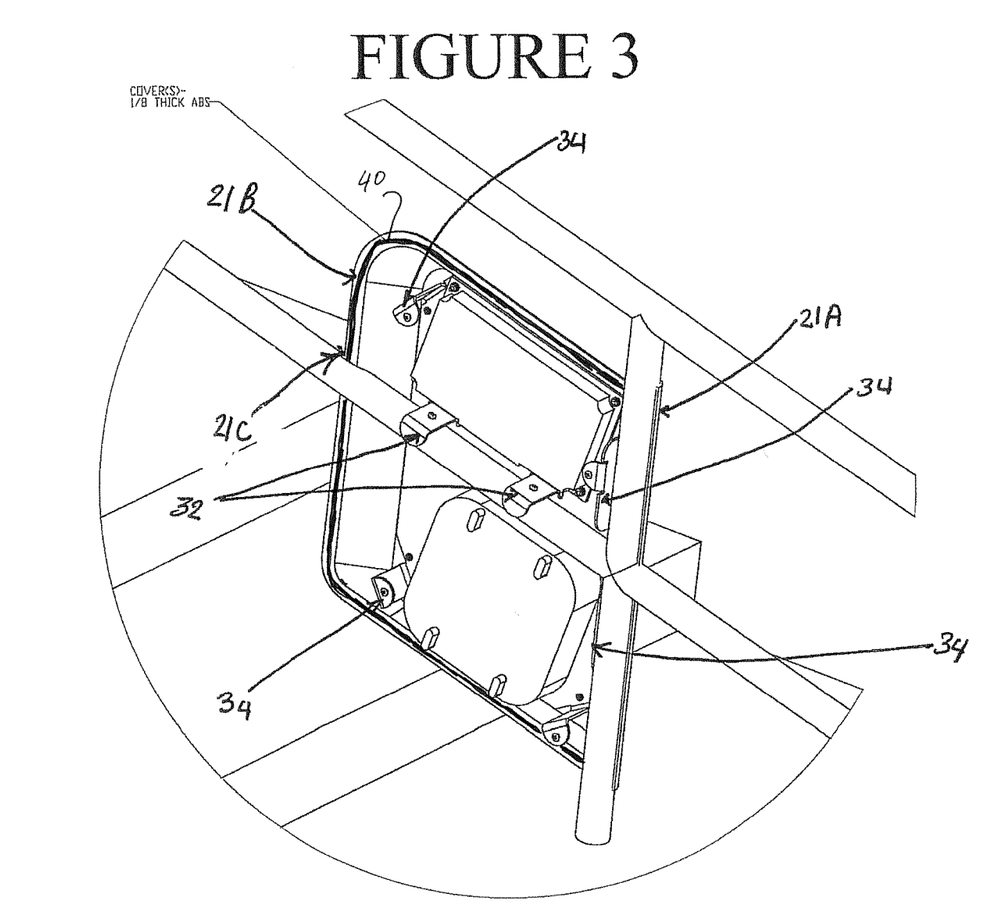
FIG. 3 is a close up of the three dimensional perspective of the handrail mountable wireless components installation apparatus of FIG. 2.
Figure 5:
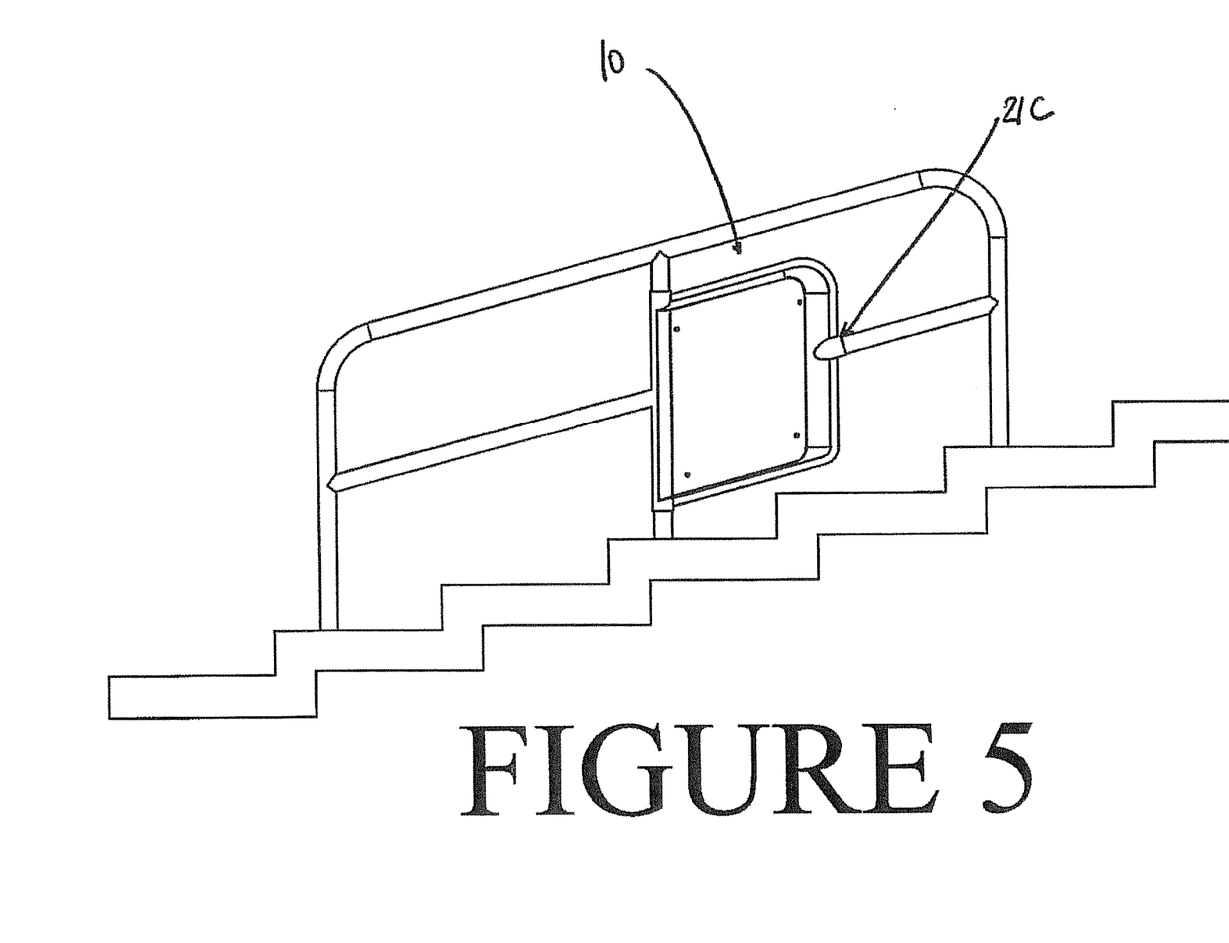
FIG. 5 is a side plan view of the handrail mountable wireless components installation apparatus of FIG. 1.
Figure 7:
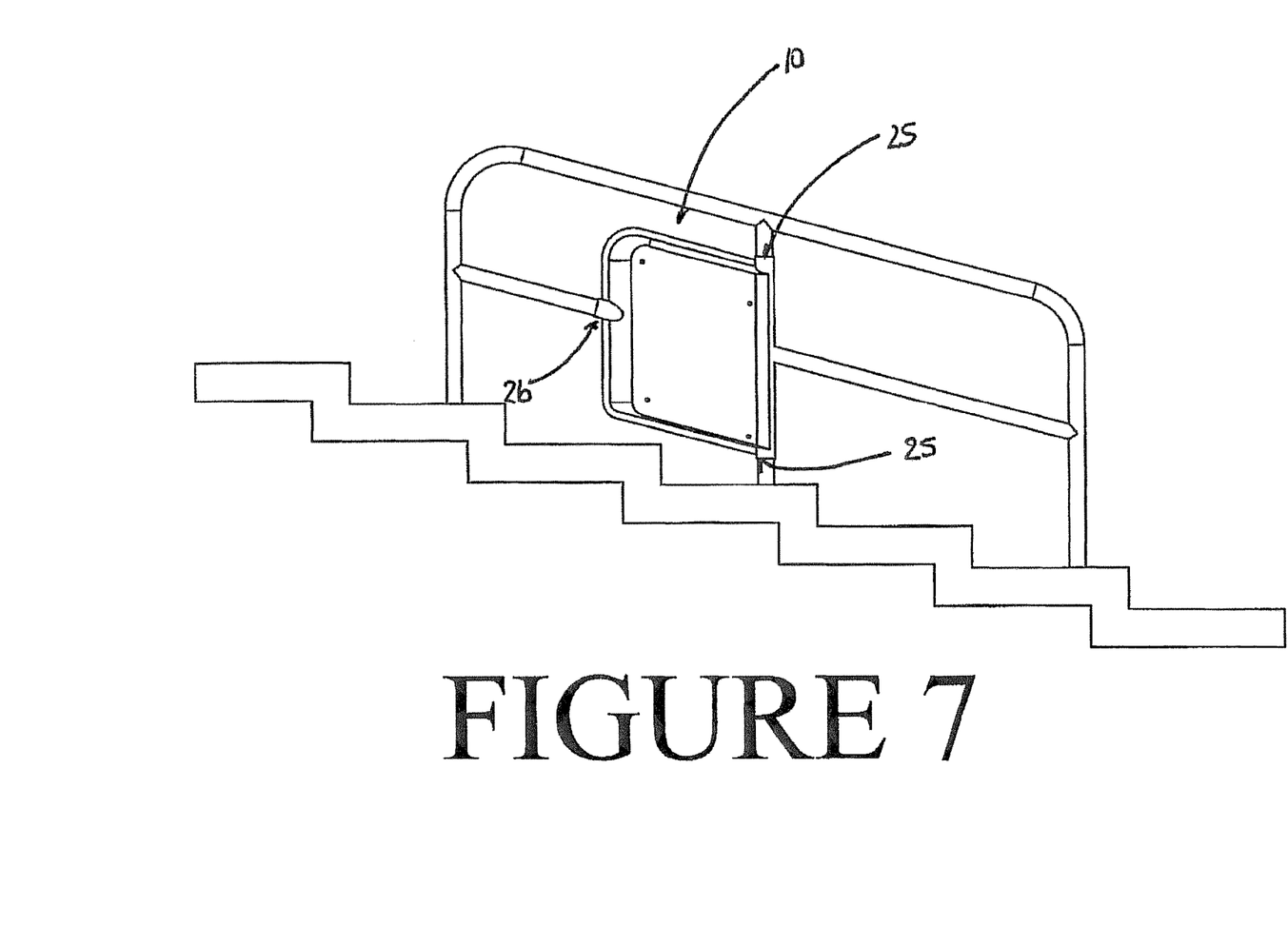
FIG. 7 is another side plan view of the handrail mountable wireless components installation apparatus of FIG. 1, from the other side of FIG. 5.
Figure 8:
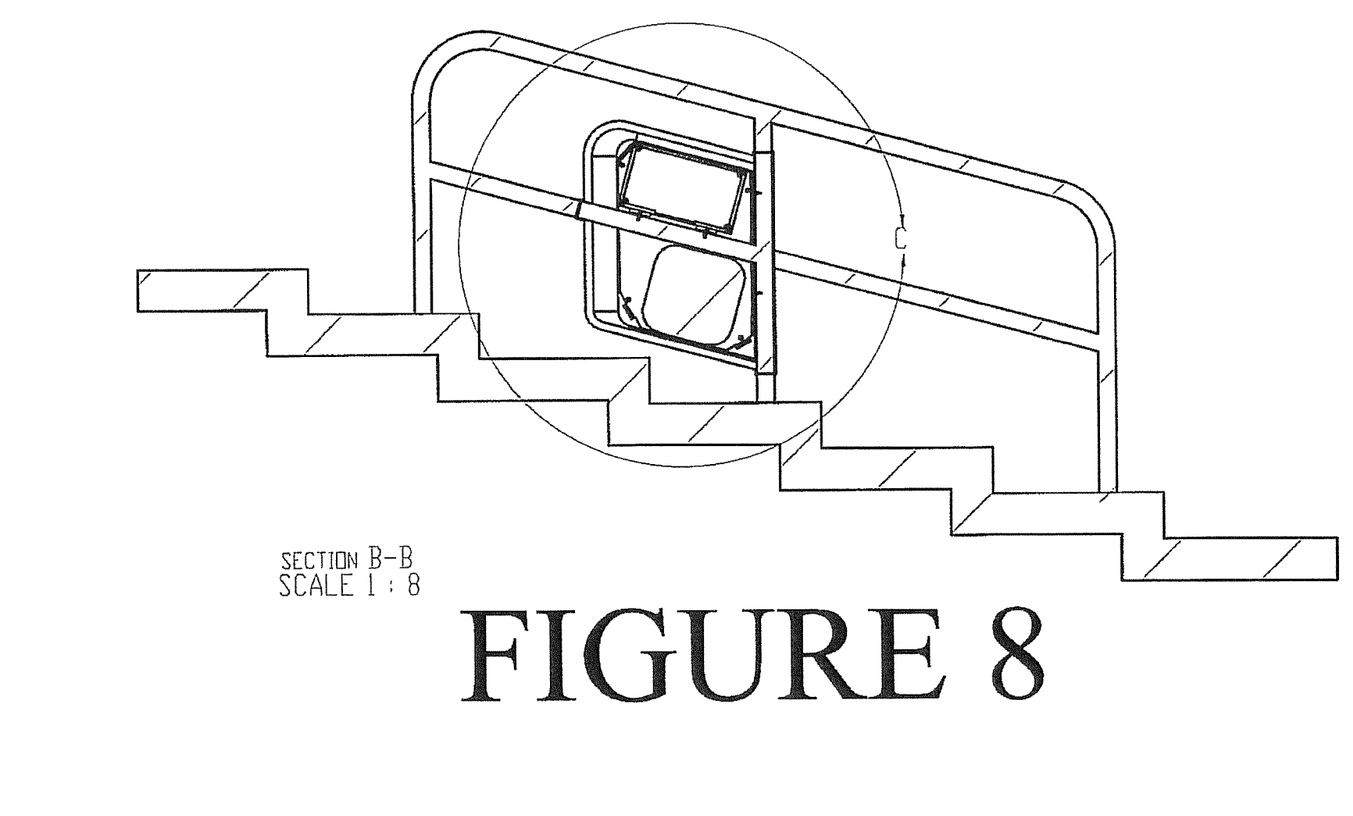
FIG. 8 is cross-section view taken along line B-B of FIG. 6, and provides a side plan view of FIG. 7 with the lid removed and showing the wireless components mounted within the housing.
Figure 9:
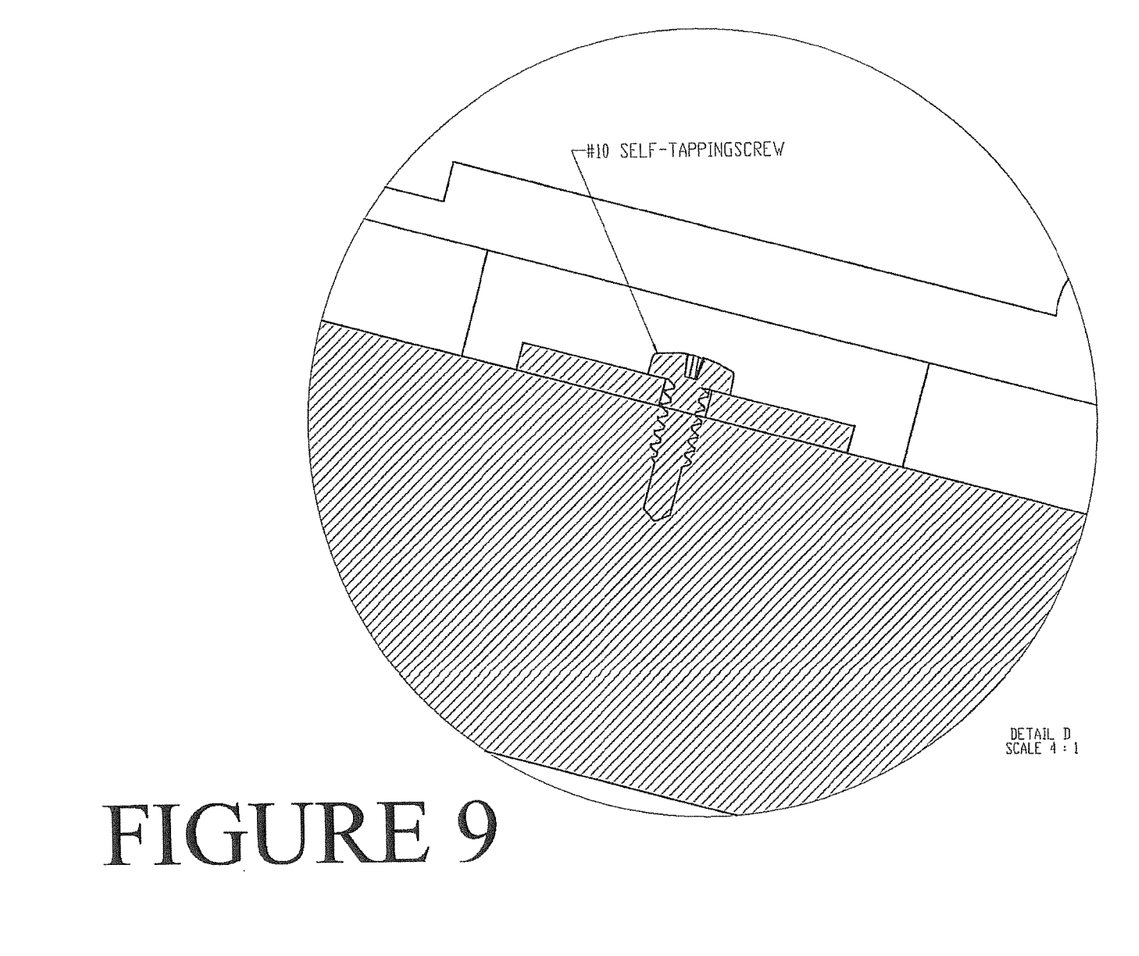
FIG. 9 is a side plan view of the circled section in FIG. 10 showing the self-tapping screw holding the chassis onto the transversal pipe of the handrail.
Figure 10:
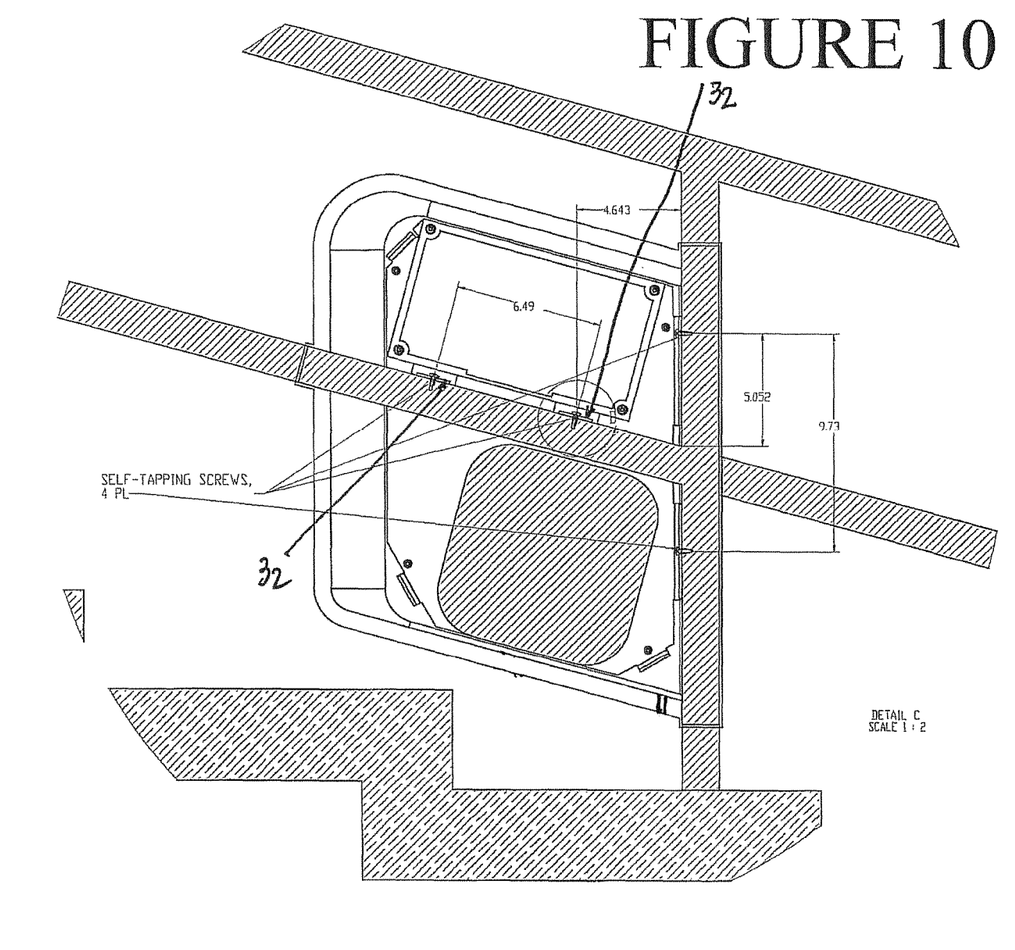
FIG. 10 is a close up of the side plan of FIG. 8.
Figure 11:
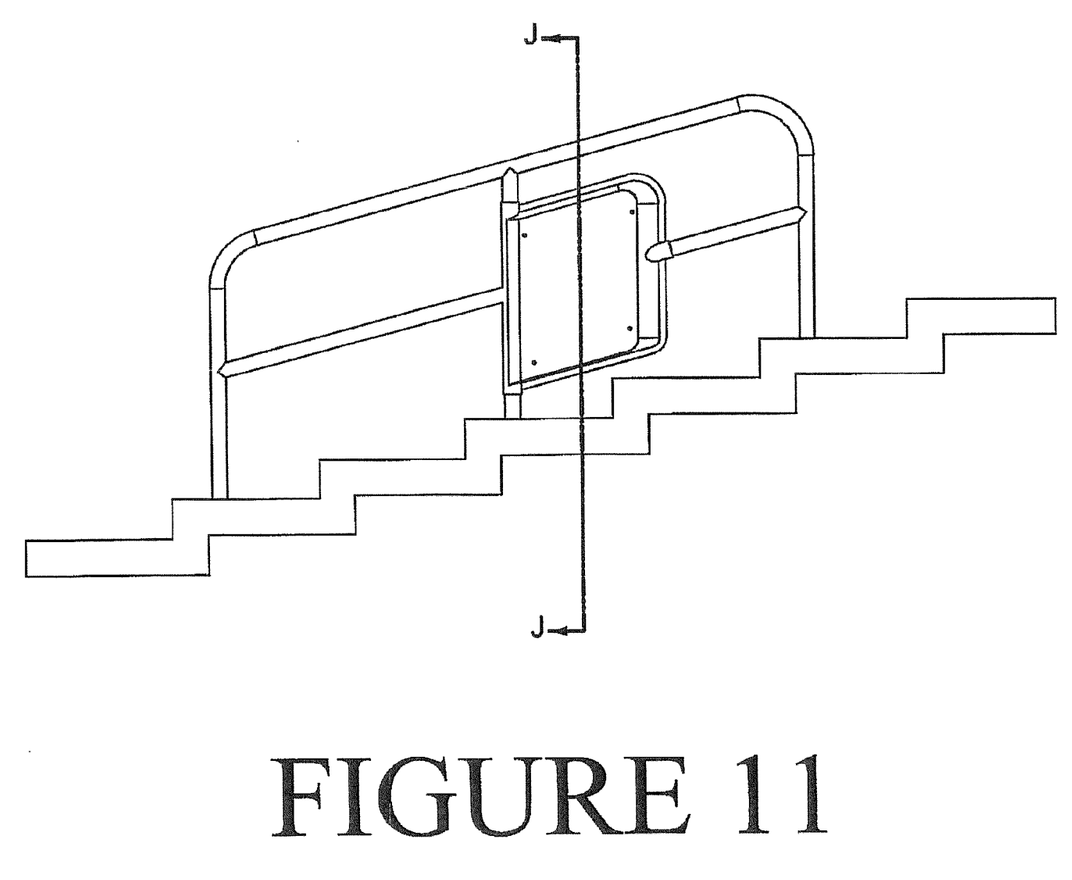
FIG. 11 is another side plan of the FIG. 5 with the line J-J through it.

Referring more specifically to FIGS. 1, 5 and 7, they generally depict one embodiment of the Handrail Mountable Wireless Components Installation Apparatus in accordance with the disclosed principles at 10. The handrail mountable wireless components installation apparatus 10 comprises a shell 20, a chassis 30 and a gasket 40. The shell 20 consists of two parts, i.e., a wireless components housing 21 ("housing 21") and a lid 22. Said housing 21 has a proximate edge 21A and a distal edge 21B, similarly lid 22 has a proximate edge and a distal edge, such that when the wireless components housing 21 and the lid 22 are snapped closed together they form the shell 20 with a shell proximate end 20C and a shell distal end 20D.

Each of the proximate edges of the housing 21 and lid 22 respectively, are semi-circularly shaped, i.e., C-shaped and complementary to each other, such that when the housing 21 and the lid 22 of shell 20 are snapped closed they form a bore 25, which runs along the entire length of the proximate end 20C of the shell 20, perpendicular to the upper and lower edges 20A and 20B of the shell 20, respectively. When the housing 21 and the lid 22 of shell 20 are snapped closed around the vertical pipe of the handrail, upon which the handrail mountable wireless components installation apparatus 10 is fixedly but removably anchored, the bore 25 completely encircles and becomes mated to the vertical pipe of the handrail, said vertical pipe running right through the bore 25 from the bottom opening of the bore 25 and through its top, perpendicular to the upper and lower edges 20A and 20B of the shell 20, respectively.

Likewise, each of the distal edges 21B and 22B of the housing 21 and the lid 22 of shell 20, respectively, is provided with a collinear, arcuate section 21C and 22C, respectively, both arcuate sections 21C and 22C being correspondingly complementary to each other such that when the housing 21 and the lid 22 are snapped closed they form a very short bore 26, which runs perpendicular to the distal end 20D of the shell 20 and provides an opening through which the transverse pipe in the hand rail can exit the shell 20. In other words, when the housing 21 and the lid 22 of shell 20 are snapped closed around the transverse pipe of the handrail, upon which the handrail mountable wireless components installation apparatus 10 is fixedly but removably anchored, the short bore 26 completely encircles and becomes mated to the transverse pipe of the handrail, said transverse pipe running right through the short bore 26, perpendicular to the distal end 20D of the shell 20 to simultaneously and properly position the handrail mountable wireless components installation apparatus 10 on the handrail.

The shell 20 of the handrail mountable wireless components installation apparatus 10 is made of ABS plastic that is thermo-formed to cost effectively develop the desired/designed shape. The thermo-forming process employs hot air to heat sheets of ABS until they become soft and then the soft plastic is drawn over a mold using a vacuum. The mold was developed using a mill to build the reverse or negative of the desired shape. To develop a complete shell 20, two molds were required, a left and a right side mold.

Figure 6:
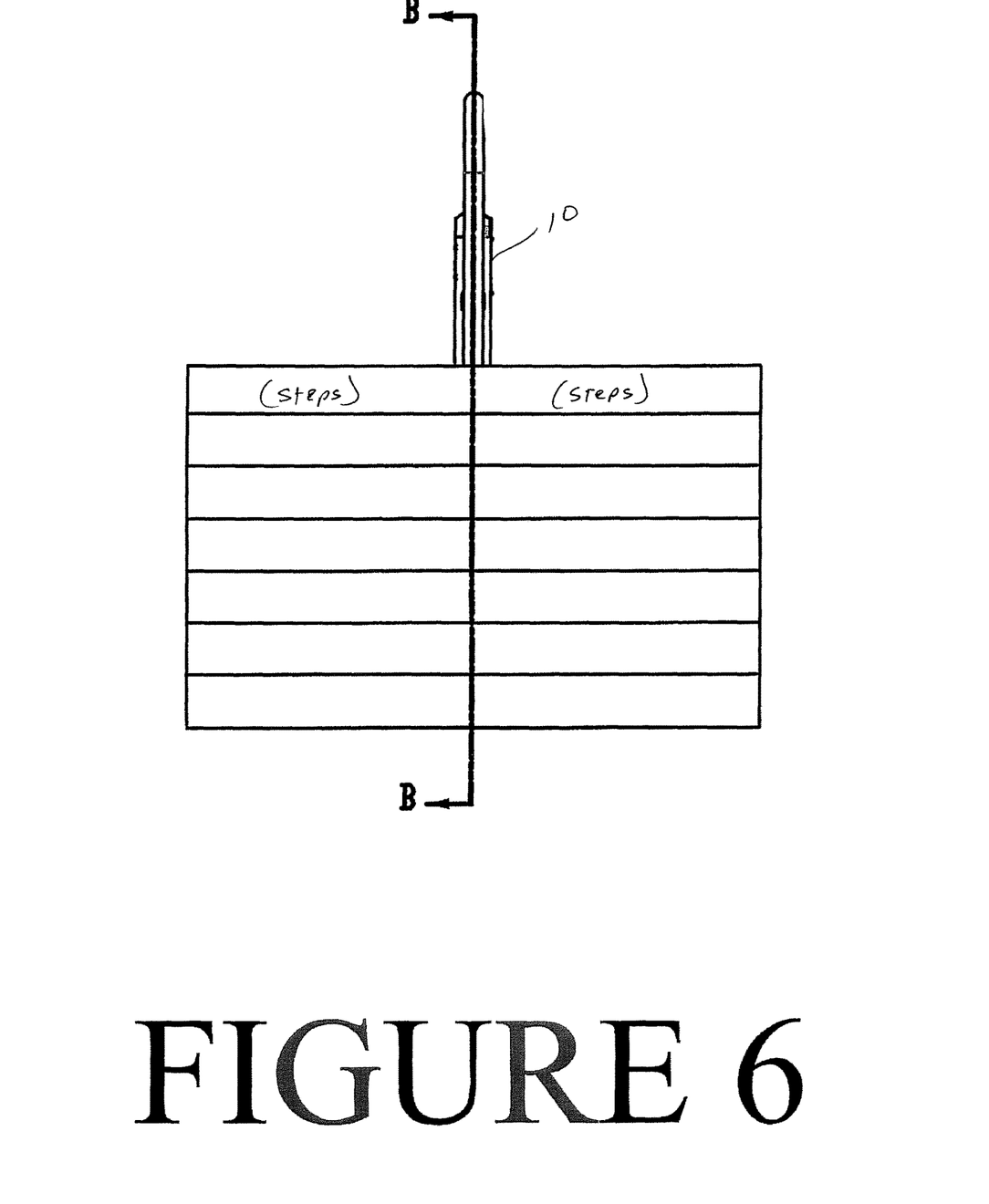
FIG. 6 is a back plan view of the handrail mountable wireless components installation apparatus of FIG. 1.
Figure 12:
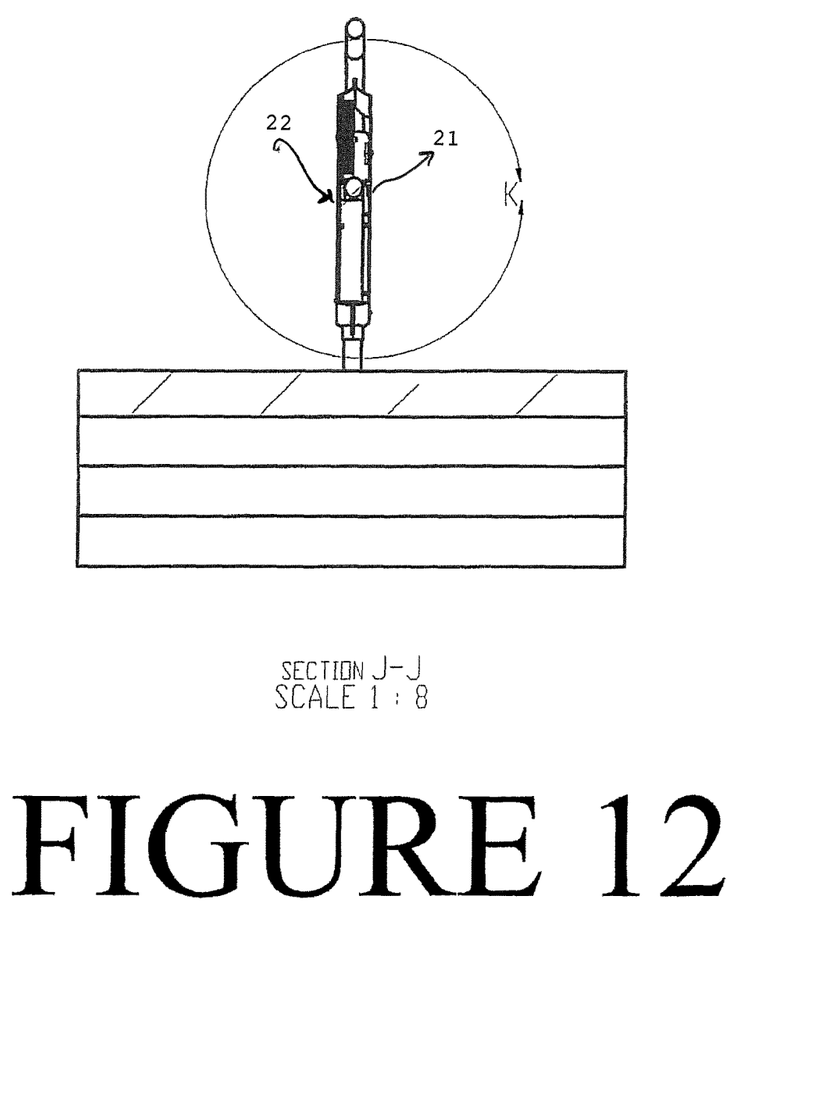
FIG. 12 is a side view of the cross-section take along the line J-J of the handrail mountable wireless components installation apparatus of FIG. 11.
Figure 13:
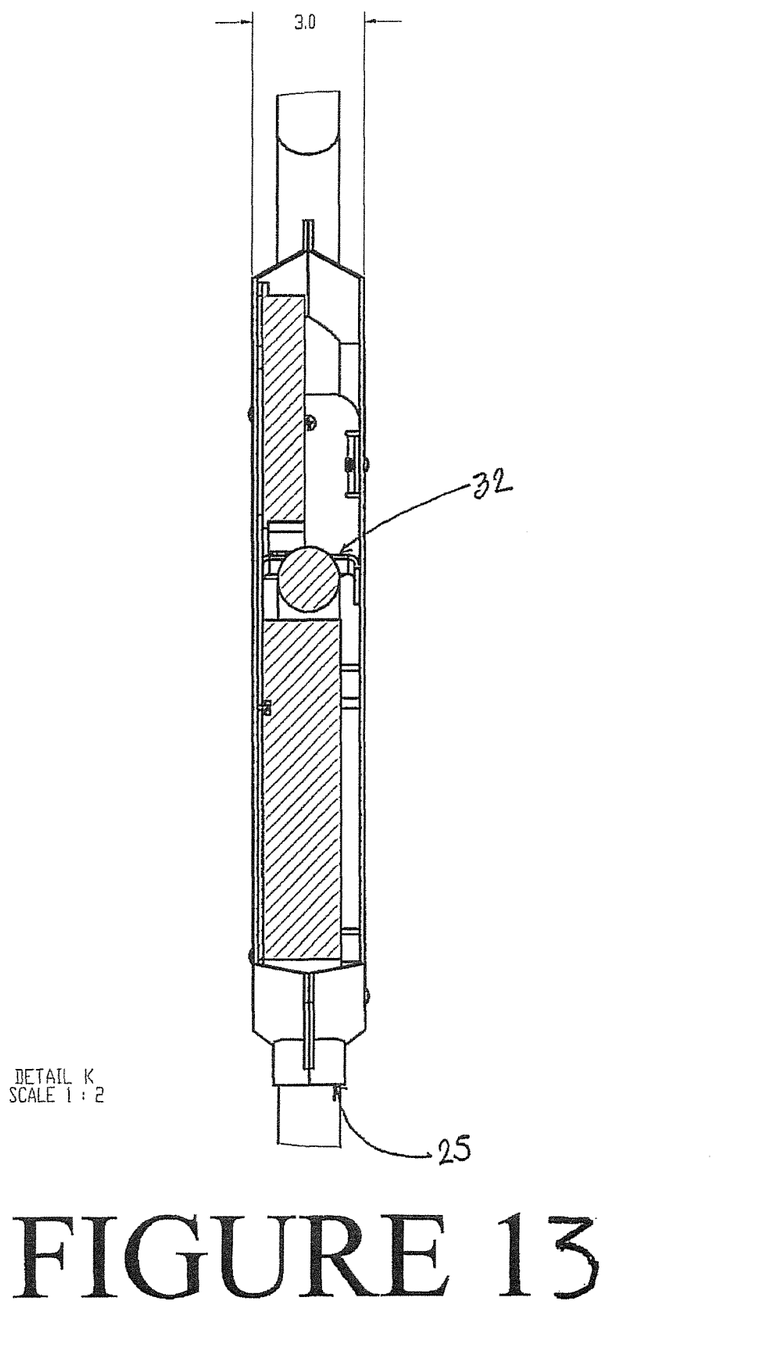
FIG. 13 is a close up of FIG. 12.

The shape of shell 20 corresponds to the space between the pipes on the handrail and its dimensions are such that when it is anchored onto the handrail, it is uniformly spaced from both the top and the bottom of the handrail and the steps (see FIGS. 6 and 12). The top, bottom, and trailing edges of each of the housing 21 and lid 22 taper towards the interior of the handrail so that the housing 21 and the lid 22 mate in the center of the handrail to form a single handrail mountable wireless components installation apparatus 10.

The handrail mountable wireless components installation apparatus 10 further comprises a chassis 30 fixedly but detachably mounted with screws on the wireless components housing 21 with captive fasteners which are aligned with 4 holes provided on the housing 21. The chassis 30 supports the wireless electronic components within said housing 21. In one embodiment of the handrail mountable wireless components installation apparatus 10, the wireless electronic components comprise a router and an antenna.

Figure 4:
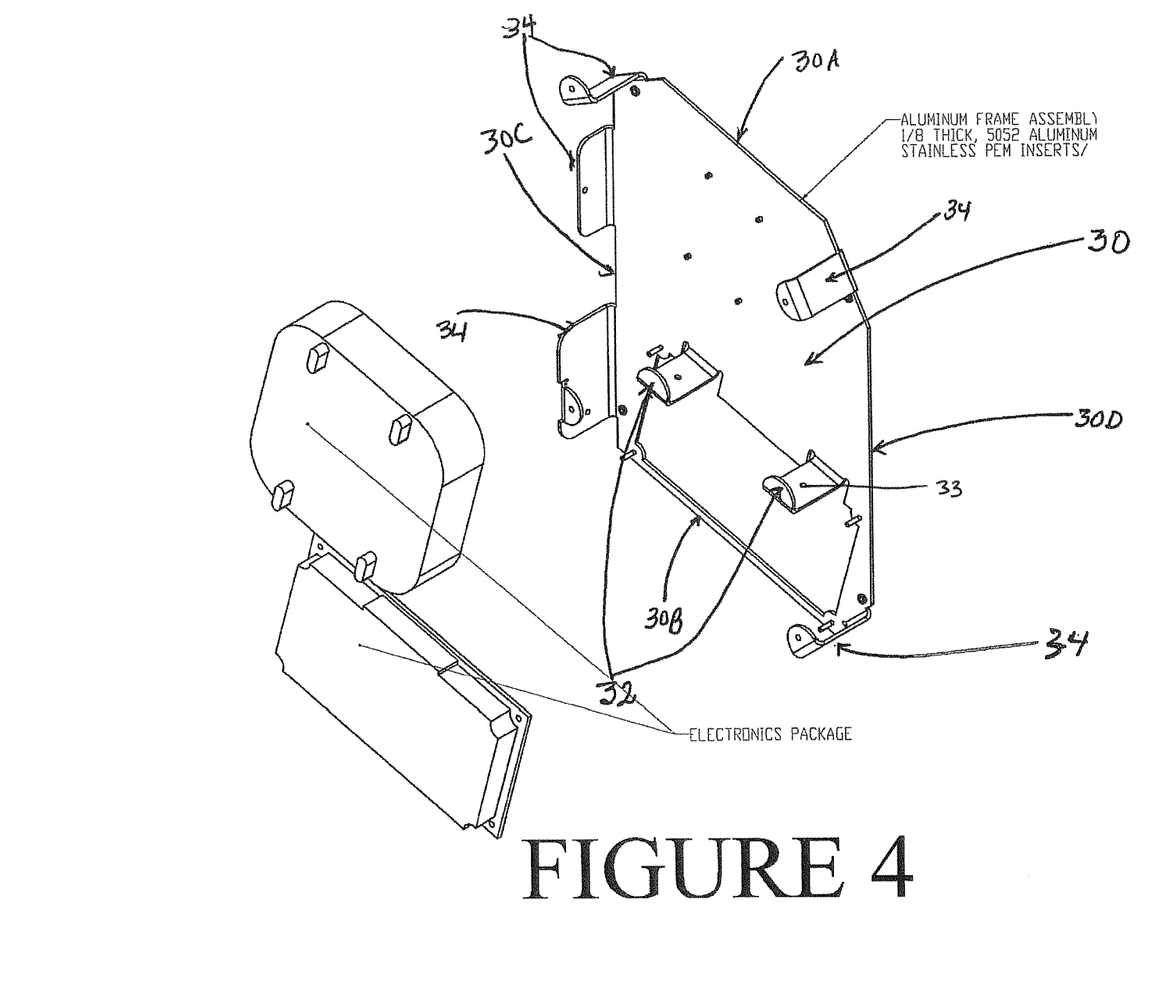
FIG. 4 is a three dimensional perspective of one of the component, i.e. the chassis of the handrail mountable wireless components installation apparatus of FIG. 2.

As is shown in FIG. 4, the chassis 30 comprises a top edge 30A, a bottom edge 30B, a proximate edge 30C, and a distal edge 30D. It further comprises two sets of brackets. One set of brackets comprises two handrail anchoring brackets 32 located in the interior section of the chassis 30. The other set of brackets comprises five lid fastening brackets 34 located at the exterior edges of the chassis 30, around its outer perimeter.

The top half of the chassis 30 above the handrail anchoring brackets 32 features four holes with pressed in nuts designed to mount a patch antenna. The chassis 30 could be cut through to form an opening behind the antenna mounting location to allow the antenna to propagate RF energy out both sides of the enclosure. A patch antenna, in its simplest form, is just a single rectangular (or circular) conductive plate that is spaced above a ground plane. Patch antennas are attractive due to their low profile and ease of fabrication. A patch antenna is a wafer-like directional antenna suitable for covering single-floor small offices, small stores and other indoor locations where access points cannot be placed centrally. Patch antennas produce hemispherical coverage, spreading away from the mount point at a width of 30 to 180 degrees. Patch antennas are also known as panel, flat panel or microstrip antennas. They are formed by overlaying two metallic plates, one larger than the other, with a dielectric sheet in the middle. This type of antenna is usually encased in white or black plastic, not only to protect the antenna, but also to make it easy to mount. Because they are flat, thin and lightweight, patch antennas are often hung on walls or ceilings where they remain visually unobtrusive and blend easily into the background. According to a preferred exemplary embodiment, the chassis may be cut to conform to the shape of the patch antenna such that maximum coverage is achieved in all directions. If the plate were solid, the aluminum would attenuate the back lobe (energy projected from the back of the antenna). If back lobe attenuation is desired, the antenna can be backed with RF absorbing foam that more effectively manages RF energy than a solid plate of aluminum. The bottom half of the frame, below the handrail anchoring brackets 32 features four holes that allow a standard access point mounting bracket to be affixed to the plate.

The two handrail anchoring brackets 32 are bent and positioned on the chassis 30 to engage a transverse handrail pipe either from its top or to support it from the bottom in a shelf-like manner. In the preferred embodiment of the invention, the two handrail anchoring brackets 32, engage the transverse handrail from the top. Each hand rail anchoring bracket 32 is optionally provided with a handrail bracket fastening hole 33. The fastening hole 33 is where the chassis 30 is fastened to the transverse handrail pipe using a self-taping screw. In the preferred embodiment there are at least two fastening holes 33, one for each hand rail anchoring bracket 32. The placement of the handrail anchoring brackets 32 automatically locates the chassis 30 and therefore the handrail mountable wireless components installation apparatus 10 in the correct vertical (top to bottom) position of the handrail.

Of the five lid fastening brackets 34, two of them are located on the proximate edge 30C of the chassis 30. The two lid fastening brackets 34 on the proximate edge 30C of the chassis 30 rest against the vertical handrail pipe. Each lid fastening bracket 34 is optionally provided with a hole for the purpose of securing the chassis 30 to the vertical handrail pipe using a self-tapping screw. The location of the two lid fastening brackets 34 on the proximate edge of the chassis 30 automatically locates the frame in the correct horizontal (front to back) position of the handrail. Each of these lid fastening brackets 34 are also provided with a second hole that is fitted with a pressed-in nut. These holes capture the external screws that fasten the lid 22 of the shell 20 to the chassis 30. The two lid fastening brackets 34 on the distal edge 30D of the chassis 30 are used exclusively to attach the lid 22 to the chassis 30. To this end, each is provided with a hole which is fitted with a pressed in nut.

A weep hole is drilled into the forward bottom edge of the left side of the shell 20 to allow any moisture that enters the enclosure to exit the enclosure preventing water from pooling in the enclosure. The chassis 30 is designed to leave a small gap between the transverse handrail pipe and the housing 21 of the shell 20. This space provides the space required to allow antenna cables to pass from access point to the antenna.

Figure 14:
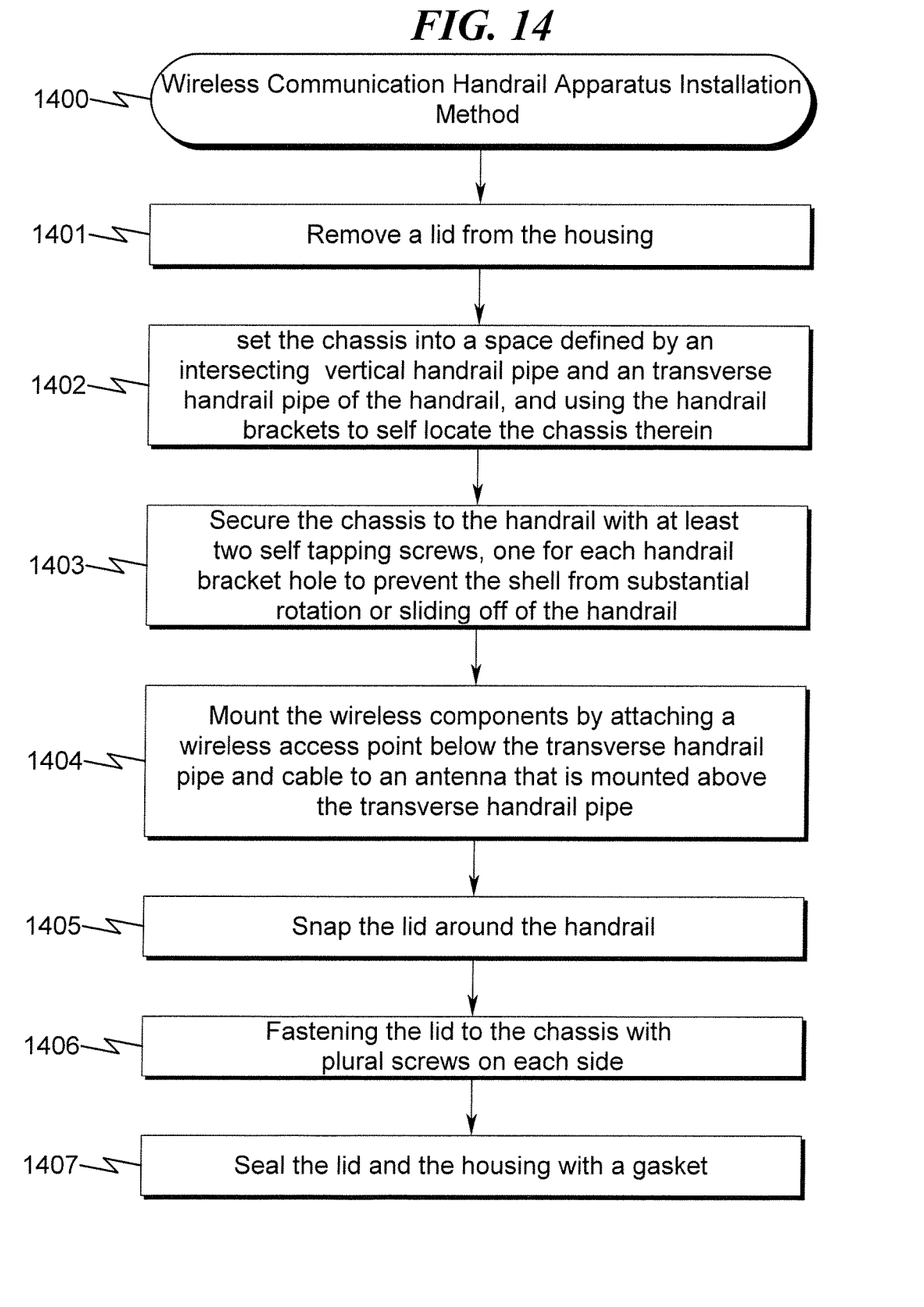
FIG. 14 shows an exemplary flowchart illustrating steps to install a wireless apparatus onto a handrail according to a preferred embodiment of the disclosed principles.

In an exemplary embodiment, the assembly and mounting of the handrail mountable wireless components installation apparatus 10 comprises the following steps:
  a. Removing the lid 22 from the housing 21 (Step 1401);
  b. Setting the chassis 30 into the space defined by the intersecting vertical handrail pipe and transverse handrail pipe of the handrail, and using the handrail brackets 32 to self-locate the chassis 30 therein (Step 1402);
  c. Securing the chassis to the handrail with at least two self-tapping screws, one for each handrail bracket hole 33. The brackets on the chassis actually carry the load of the electronics that will be installed inside the handrail mountable wireless components installation apparatus 10. The screws are used to prevent the frame from rotating or sliding off of the handrail (Step 1403);
  d. Mounting the electronics by attaching the access point below the transverse handrail pipe and cabled to an antenna that is mounted above the transverse handrail pipe. Mounting the antenna above the transverse handrail pipe is important as the goal of the design is to get the antenna as high above the ground as possible without affecting the ability to grab the handrail above the enclosure (Step 1404);
  e. Snapping the lid 22 around the handrail (Step 1405);
  f. Fastening the lid 22 to the chassis using four screws on each side. It is recommended that the screws employed are stainless steel to prevent corrosion and employ a safety or tamper proof design for security (Step 1406);
  g. Sealing the lid 21 and the housing 22 with a gasket 40, such that no moisture can enter the shell 20 of the handrail mountable Wireless Components Installation Apparatus 10 (Step 1407).

There is no question that the inventive mountable handrail wireless components enclosure described herein above, accomplishes all of its objectives. To with: provide a handrail mountable wireless components enclosure, which automatically places the wireless components in the correct position and orientation on the hand rail, ensures that the installation can be reliably performed by a person with minimal familiarity with the application and increases the network quality by reducing the opportunity for installation errors.

While particular embodiments of the invention have been illustrated and described in detail herein, they are provided by way of illustration only and should not be construed to limit the invention. Since certain changes may be made without departing from the scope of the disclosed principles, it is intended that all matter contained in the above description, or shown in the accompanying drawings be interpreted as illustrative and not in a literal sense. Practitioners of the art will realize that the sequence of steps and the embodiments depicted in the figures can be altered without departing from the scope of the disclosed principles and that the illustrations contained herein are singular examples of a multitude of possible depictions of the disclosed principles.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A handrail mountable wireless communication apparatus comprising:
  one or more wireless electronic components;
  a shell comprising:
    a first portion;
    a second portion coupleable to the first portion;
    a cavity disposed between the first portion and the second portion, when the first portion and the second portion are coupled; and
    one or more bores through the shell, wherein when the first portion and the second portion are coupled at least one of the bores is created through the shell; and
  a chassis disposed in the cavity of the shell, wherein the chassis allows coupling of one or more of the wireless electronic components to the chassis;
  wherein the first portion and the second portion of the shell are capable of surrounding at least two rails of a handrail of a venue such that the handrail passes through one or more of the bores in the shell, and wherein the handrail is disposed proximate an inclined surface of the venue, and wherein at least two of the rails are disposed at different angles relative to the inclined surface of the venue.

2. The apparatus of claim 1 wherein the first portion and the second portion of the shell are sealed with a gasket.

3. The apparatus of claim 1 wherein the chassis is coupled to the handrail.

4. The apparatus of claim 1 wherein the chassis comprises a plate.

5. The apparatus of claim 1 wherein the apparatus is weather resistant.

6. The apparatus of claim 1 wherein the venue comprises a public venue.

7. The apparatus of claim 1 wherein the handrail is coupled to stairs in the venue.

8. A handrail mountable wireless communication apparatus comprising:
one or more wireless electronic components;
a two-piece shell comprising:
a housing portion;
a lid coupleable to the housing of the shell;
a cavity disposed between the housing and the lid, when the housing and the lid of the shell are coupled, and wherein at least one of the wireless electronic components is disposed in the cavity; and
at least one bore through the shell, wherein when the housing and the lid are coupled at least one of the bores is created through the shell; and
a chassis disposed in the cavity of the shell, wherein the chassis allows coupling of one or more of the wireless electronic components to the chassis, wherein the chassis is coupleable to the housing of the shell; and
at least one bracket coupleable to the handrail;
wherein the housing and the lid of the shell are capable of surrounding at least two intersecting rails of a handrail of a venue such that the handrail passes through at least one of the bores in the shell.

9. The apparatus of claim 8 wherein the lid and the housing of the shell are sealed when the lid and the housing are coupled.

10. The apparatus of claim 8 wherein the handrail comprises:
an upper transverse pipe,
a lower transverse pipe,
and a third pipe that intersects at least the lower transverse pipe;
wherein the at least two intersecting rails of the handrail comprises the lower transverse pipe and the third pipe, and wherein the apparatus is coupled to the lower transverse pipe of the handrail.

11. The apparatus of claim 8 wherein the shell further comprising a weep hole.

12. The apparatus of claim 8 wherein the at least two intersecting rails of the handrail comprises at least one transverse pipe and at least one vertical pipe, and wherein the at least one transverse pipe of the handrail passes through the bore of the shell, and further comprising an additional bore disposed at least partially through the shell, and wherein at least one of the vertical pipes passes at least partially through the additional bore.

13. A handrail mountable wireless communication apparatus comprising:
one or more wireless electronic components;
a shell comprising:
a cavity; and
at least one bore through the shell;
a chassis adapted to be disposed in the cavity of the shell, wherein the chassis allows mounting of one or more of the wireless electronic components to the chassis;
wherein the shell encircles an outer surface of a portion of a handrail of a venue when the shell is closed, and wherein a first rail of the handrail passes through a first bore proximate a first end of the shell, and wherein a second rail of the handrail passes through a second bore in the shell.

14. The apparatus of claim 13 further comprising one or more brackets capable of coupling the apparatus to the handrail.

15. The apparatus of claim 14 wherein one or more of the brackets are coupled to the chassis.

16. The apparatus of claim 13 wherein the chassis is detachably coupleable to the shell.

17. The apparatus of claim 13 wherein at least one of the wireless electronic components comprises a wireless access point, and wherein the handrail is further configured as a conduit for low voltage cables that connect said wireless access point to a network.

18. The apparatus of claim 13 wherein said shell comprises of material resistant to inclement environmental conditions.

19. The apparatus of claim 13 wherein the shell comprises a two-part shell, wherein the parts of the shell are capable of being coupled to close around a part of the handrail, and wherein the parts of the shell are capable of being uncoupled to open the shell, and wherein one or more of the wireless electronic components are coupled to the shell, and wherein the two-part shell is capable of being closed around the handrail such that the handrail passes through one of the bores of the shell.

20. The apparatus of claim 19 further comprising a gasket, wherein the gasket seals the two parts of the shell when the shell is closed.

21. The apparatus of claim 13 wherein the shell further comprises a weep hole formed through an edge of said shell.

22. The apparatus of claim 13 wherein the handrail comprises a vertical pipe, and wherein the vertical pipe of the handrail passes at least partially through at least one of the bores in the shell.

* * * * *